(12) United States Patent
Ieradi

(10) Patent No.: US 11,813,972 B2
(45) Date of Patent: Nov. 14, 2023

(54) APPARATUS FOR MOVING AND SECURING ARTICLES IN A PICKUP TRUCK CARGO BED

(71) Applicant: Giuseppe Ieradi, Maple (CA)

(72) Inventor: Giuseppe Ieradi, Maple (CA)

(73) Assignee: Giuseppe Ieradi, Maple (CA)

( * ) Notice: Subject to any disclaimer, the term of this patent is extended or adjusted under 35 U.S.C. 154(b) by 119 days.

(21) Appl. No.: 16/900,038

(22) Filed: Jun. 12, 2020

(65) Prior Publication Data

US 2020/0391645 A1 Dec. 17, 2020

Related U.S. Application Data

(60) Provisional application No. 62/860,584, filed on Jun. 12, 2019.

(51) Int. Cl.
| | |
|---|---|
| *B60P 1/36* | (2006.01) |
| *B60P 7/06* | (2006.01) |
| *B60P 1/52* | (2006.01) |
| *E05F 15/60* | (2015.01) |
| *E05F 15/56* | (2015.01) |
| *B60P 1/00* | (2006.01) |

(52) U.S. Cl.
CPC .............. *B60P 1/365* (2013.01); *B60P 1/006* (2013.01); *B60P 1/52* (2013.01); *B60P 7/06* (2013.01); *E05F 15/56* (2015.01); *E05F 15/60* (2015.01); *E05Y 2900/53* (2013.01)

(58) Field of Classification Search
CPC .................................. B60P 1/006; B60P 1/365
See application file for complete search history.

(56) References Cited

U.S. PATENT DOCUMENTS

| | | | | |
|---|---|---|---|---|
| 3,727,971 A | * | 4/1973 | Sisler ..................... | B62D 33/02 224/543 |
| 4,752,095 A | * | 6/1988 | Brady ..................... | B60R 11/06 224/310 |
| 5,273,390 A | * | 12/1993 | Crissman ............... | B60P 1/006 414/509 |
| 6,003,923 A | * | 12/1999 | Scott ...................... | B60R 11/06 296/37.6 |
| 6,945,580 B1 | * | 9/2005 | Hentes ..................... | B60R 9/00 224/404 |
| 8,100,615 B1 | * | 1/2012 | Freeborn .................. | B60P 7/14 410/140 |
| 9,656,589 B2 | * | 5/2017 | Crawford, Jr. ............ | B60P 1/52 |

(Continued)

*Primary Examiner* — Mark C Hageman
(74) *Attorney, Agent, or Firm* — NORTON ROSE FULBRIGHT CANADA LLP

(57) ABSTRACT

An apparatus is provided for moving and securing articles in a pickup truck cargo bed. The pickup truck cargo bed may have opposing sidewalls, cab wall, tailgate, and floor. The apparatus comprises a plurality of tracks configured to connect to the pickup truck cargo bed, the plurality of tracks extending substantially along a longitudinal length of the pickup truck cab and defining a channel. A push plate slidably is mounted to the plurality of tracks with a movement member, and the push plate configured to stand perpendicular to the floor. The apparatus also comprises an actuator in mechanical communication with the push plate, the actuator configured to move the push plate to a desired position in the pickup truck cargo bed. An adjustable enclosed area is defined by the push plate, opposing side walls, and tail gate.

10 Claims, 6 Drawing Sheets

(56) References Cited

U.S. PATENT DOCUMENTS

| | | | |
|---|---|---|---|
| 10,173,609 B1* | 1/2019 | Grimes | B62D 33/048 |
| 2006/0102669 A1* | 5/2006 | Fouts | B60R 9/00 |
| | | | 224/404 |
| 2006/0255189 A1* | 11/2006 | Niemela | A01C 15/006 |
| | | | 239/656 |
| 2013/0094931 A1* | 4/2013 | Bluhm | B60P 1/431 |
| | | | 414/523 |
| 2014/0219755 A1* | 8/2014 | Lambert | B60P 1/006 |
| | | | 414/516 |
| 2016/0159261 A1* | 6/2016 | Lamber | B60P 1/006 |
| | | | 414/467 |
| 2017/0349106 A1* | 12/2017 | Zajicek | B60R 9/02 |

* cited by examiner

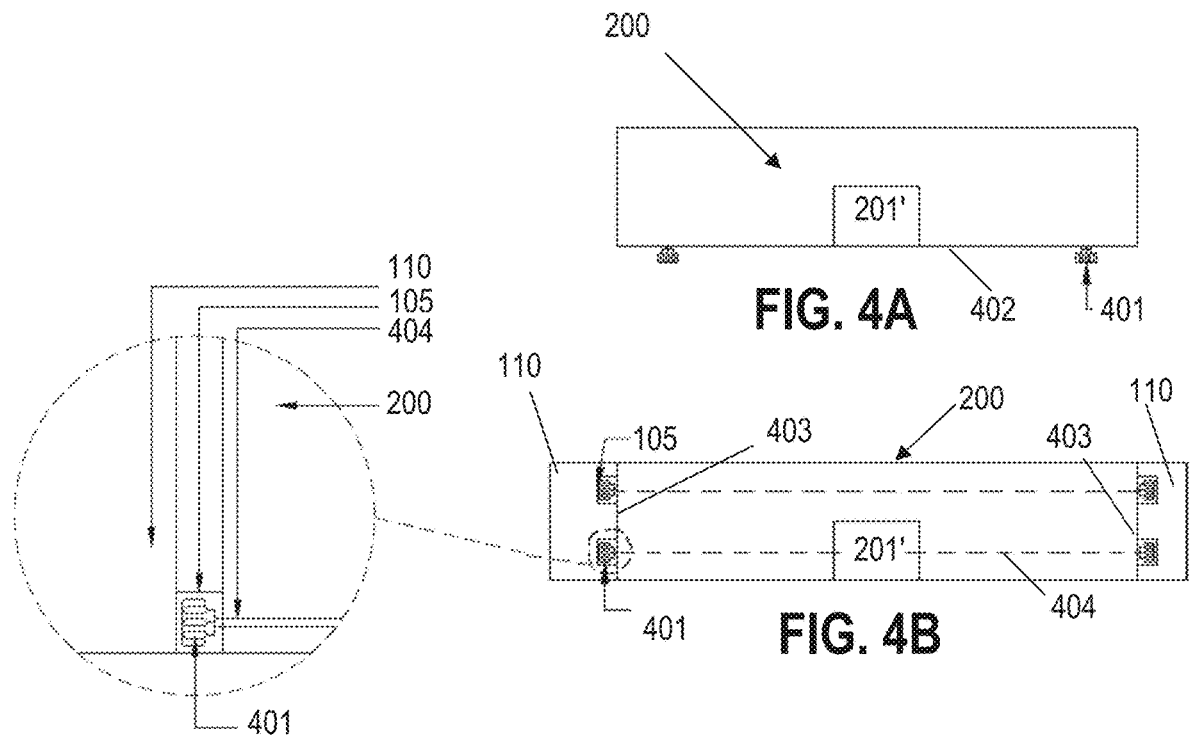
FIG. 4A
FIG. 4B
FIG. 5A
FIG. 4C
FIG. 5B
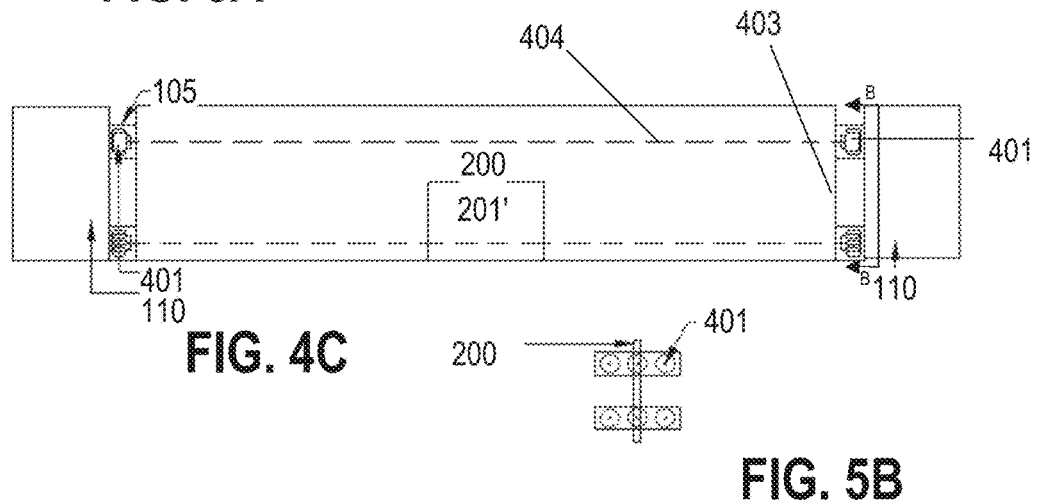

APPARATUS FOR MOVING AND SECURING ARTICLES IN A PICKUP TRUCK CARGO BED

FIELD

The present invention generally relates to storage of articles in vehicles and in particular to securing and moving articles in a pickup truck cargo bed.

BACKGROUND

Pickup trucks generally have cargo beds for storage of articles during transit. The storage area for the pickup truck beds are typically defined by opposing sidewalls along the lateral edge of the cargo bed, a wall behind the pickup truck cab, and a tailgate of the pickup truck. Articles placed in the storage area of the pickup truck may then slide, roll, or otherwise move within the storage area when the pickup truck is driven.

Various pickup truck cargo bed accessories have been created to secure or restrict movement of the articles within the cargo bed. For example, some pickup truck cargo beds may have a ribbed floor to limit an article's ability to slide. A cover may also be placed over a pickup truck cargo bed to secure articles within the volume beneath the cover. However, these accessories do not completely restrict articles from movement within the storage area of the pickup truck. Other accessories have been developed such as storage boxes that may be attached to the walls of the pickup truck cargo bed so that articles can be placed inside the boxes. These storage boxes have a specific volume and may not accommodate articles larger than the boxes. Further, none of the above noted pickup truck cargo bed accessories are capable of actively assisting offloading a pickup truck cargo bed.

SUMMARY

An apparatus for securing articles in a pickup truck cargo bed is provided which has a push plate that may be actuated to secure articles in the pickup truck cargo bed between the push plate and a tailgate and/or wall(s) of the pickup truck cargo bed. Actuation of the push plate may further be used to slide articles in the pickup truck cargo bed toward the tailgate for offloading. Movement of the push plate within the pickup truck cargo bed defines a variable storage area that may accommodate articles of various sizes.

According to an aspect of the invention there is provided an apparatus for moving and securing articles in a pickup truck cargo bed having opposing sidewalls, cab wall, tailgate, and floor, the apparatus comprising: a plurality of tracks configured to connect to the pickup truck cargo bed, the plurality of tracks extending substantially along a longitudinal length of the pickup truck cab and defining a channel; a push plate slidably mounted to the plurality of tracks with a movement member, the push plate configured to stand perpendicular to the floor; and an actuator in mechanical communication with the push plate, the actuator configured to move the push plate to a desired position in the pickup truck cargo bed; wherein the push plate, opposing side walls, and tail gate define an adjustable enclosed area.

In an embodiment, the movement member is a roller.

In an embodiment, when activated, the actuator moves the push plate until the articles of the pickup truck cargo bed abut the push plate and either the cab wall or tailgate.

In an embodiment, opposing compartments are each configured to couple to each one of the opposing sidewalls.

In an embodiment, each compartment is configured to be mounted onto opposing wheel wells of the pickup truck cargo bed.

In an embodiment, the plurality of tracks are connected to each of the opposing compartments.

In an embodiment, the plurality of tracks are connected to the floor of the pickup truck cargo bed.

In an embodiment, the actuator is an motor is connected to the push plate with a cable, the motor configured to push plate to the desired position when activated.

In an embodiment, the actuator is a hydraulic piston, scissors lift, gear driver, or spiral lift.

Another aspect of the invention is directed to an apparatus for moving articles in a pickup truck cargo box comprising: a plurality of rollers each having an axel connected to opposing attachment members, the plurality of roller spaced along a length of each of the opposing attachment members, wherein the opposing attachment members are configured to extend along a longitudinal length of the pickup truck cargo box.

In an embodiment, the opposing attachment members have a substantially U-shaped cross-section configured to couple with a floor of the pickup truck cargo box, the opposing attachment members supporting the roller between each of the opposing attachment members. In a further embodiment, the substantially U-shaped cross-section is configured to couple with longitudinal ribs of the floor of the pickup truck cargo box.

BRIEF DESCRIPTION OF DRAWINGS

In the figures, which depict example embodiments:

FIG. 4A is an elevation views of a push plate having a rollers on a bottom edge of a push plate. FIG. 4B is an elevation views of a push plate having a rollers on a lateral edge of a push plate, the rollers being located in tracks defined by a compartment. FIG. 4C is an elevation view of a push plate having rollers on a lateral edge of the push plate where the rollers are located in tracks connected to a compartment.

FIG. 5A is an enlarged fragmentary view of one of the rollers of FIG. 4B. FIG. 5B is a cross-sectional view of a roller along the line B-B of FIG. 4C.

DETAILED DESCRIPTION

Figure 1A:
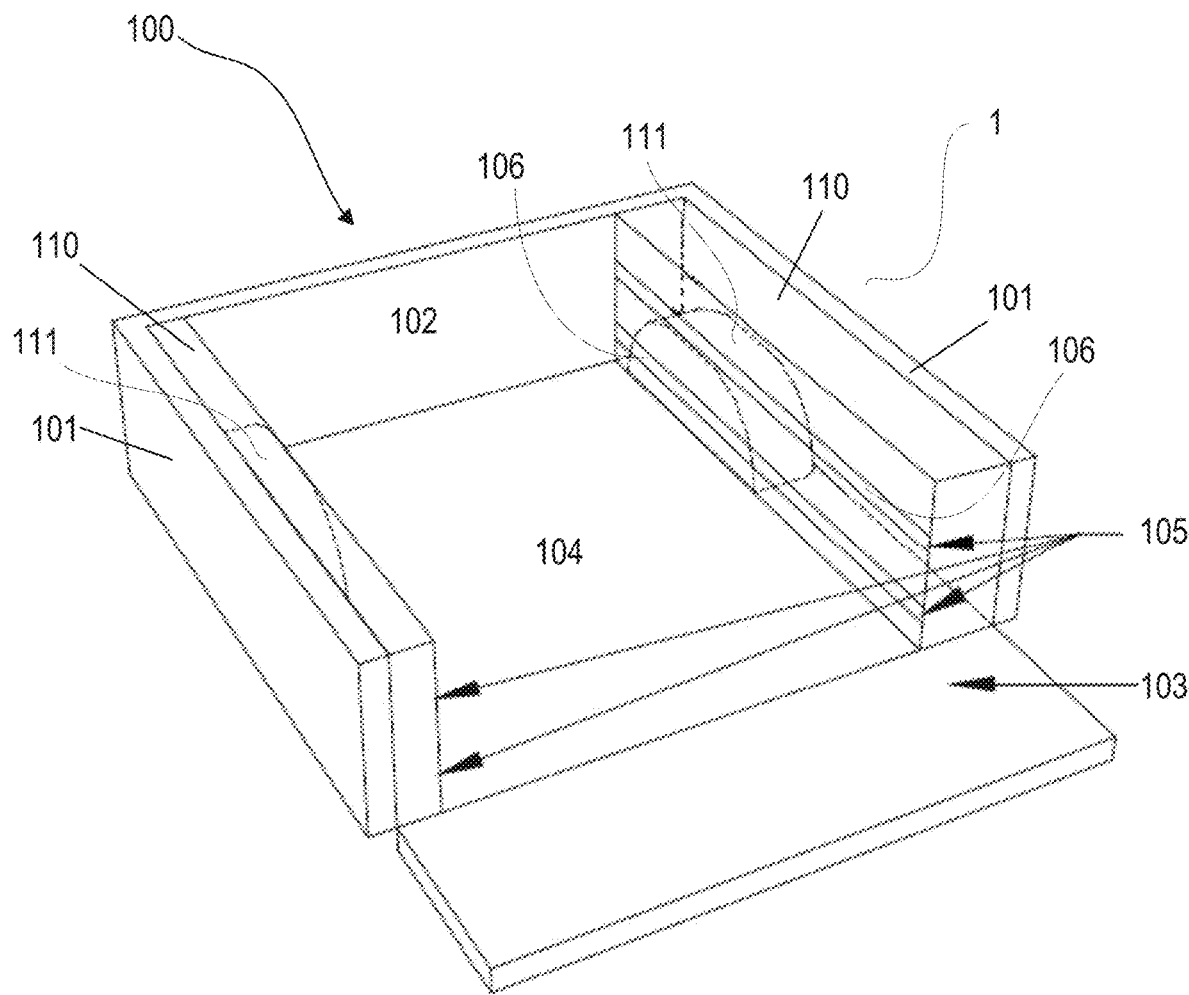
FIG. 1A is an perspective view of a pickup truck cargo bed.
Figure 1B:
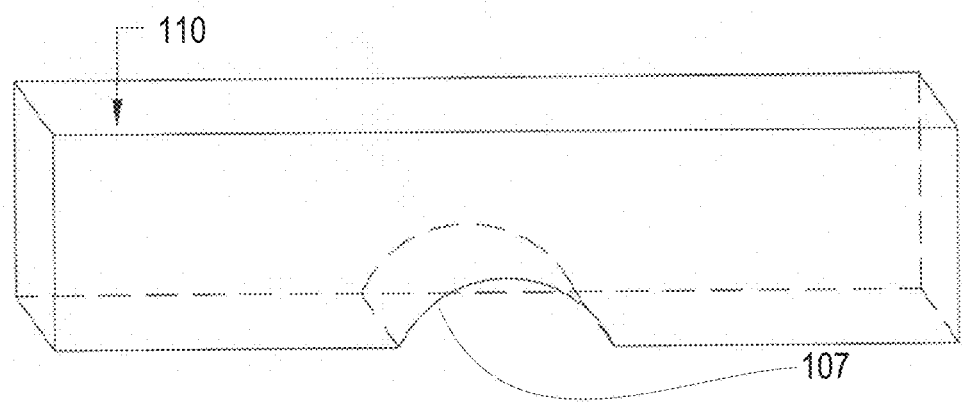
FIG. 1B is a perspective view of a storage compartment shown in FIG. 1A.

FIG. 1A shows a perspective of a pickup truck cargo bed 100 having opposing sidewalls 101, cab wall 102, tailgate 103, and floor 104. An apparatus 1 for moving and securing articles in the pickup truck cargo bed 100 is connected to the pickup truck cargo bed. The apparatus 1 may be configured and sized to fit any pickup truck cargo bed. Examples of pickup truck cargo bed sizes are 72¾" (185 cm) wide, 84" (213 cm) long, and 20" (51 cm) high. Other example pickup truck cargo bed width sizes are 68" (173 cm), 84" (213 cm), or 96" (244 cm). In an embodiment, storage compartments 110 may be connected to opposing sidewalls 101 and/or cab wall 102. As shown, compartments 110 are configured to abut wheel well 111 and extend along a longitudinal length of the pickup truck cargo bed 100. As shown in FIG. 1B, storage compartment 110 may have a unitary construction that may extend along the length of the pickup truck cargo bed 100 from bar wall 102 to tailgate 103. Storage compartment 110 may have an arcuate portion configured to receive a wheel well 111. In an embodiment, compartment 110 may comprise a plurality of sub-compartments or have a non-unitary structure. A plurality of tracks 105 are configured to connect to the pickup truck cargo bed 100 and may be provided as a distinct component from the pickup truck cargo bed. As shown, the plurality of tracks 105 are connected to each compartment 110; however, the tracks 105 may be connected to, or embedded within, the compartments 110. In other examples, the plurality of tracks 105 may be separately connected to each of the opposing side walls 101 or floor 104. In a further example, the plurality of tracks 105 may be connected to, or embedided within, a frame configured to fit within the pickup truck cargo bed 100. Other means of connecting the plurality of tracks to the pickup truck cargo bed 100 may be used and the invention is not limited to the illustrated embodiments. The plurality of tracks 105 may extend along a substantial longitudinal length of the pickup truck cab and define a channel 106 configured to receive a movement member (shown in FIGS. 4A and 4B). In some embodiments, track 105 may be in the shape of a winch track, Purlin "C", or be generally C-shaped and may have an opening defined by inturned laterally extending edges. A push plate 200 (shown in FIG. 2) is provided to engage articles placed into the pickup truck cargo bed 100. Push plate 200 may have a plurality of movement members 401 connected to the side edges, bottom edge, or combinations of the sides edges and bottom edge of the push plate. Each movement member 401 may be configured to slidably engage a corresponding channel 106. In an embodiment, movement members 401 may be rollers that are configured to roll within channel 106 to support push plate 200 as it moves within pickup truck cargo bed 100. Push plate 200 may be mounted to the plurality of tracks with the movement members 401, which may be configured such that the push plate 200 stands perpendicular to the floor 104 as push plate 200 moves along the plurality of the tracks 105. As push plate 200 moves along the plurality of tracks, the push plate's width may span a substantial amount of the distance between the opposing sidewalls 101 or compartments 110, as the push plate 200 moves along a longitudinal length of the pickup truck cargo bed 100. An actuator 201, in mechanical communication with the push plate 200, is configured to move the push plate 200 to a desired position in the pickup truck cargo bed 100. The actuator 201 may be a hydraulic piston, scissors lift, gear driver, or spiral lift. Other types actuators may also be used such as a motor driving a cable connected to the push plate 200 (shown in FIG. 2.).

Figure 2:
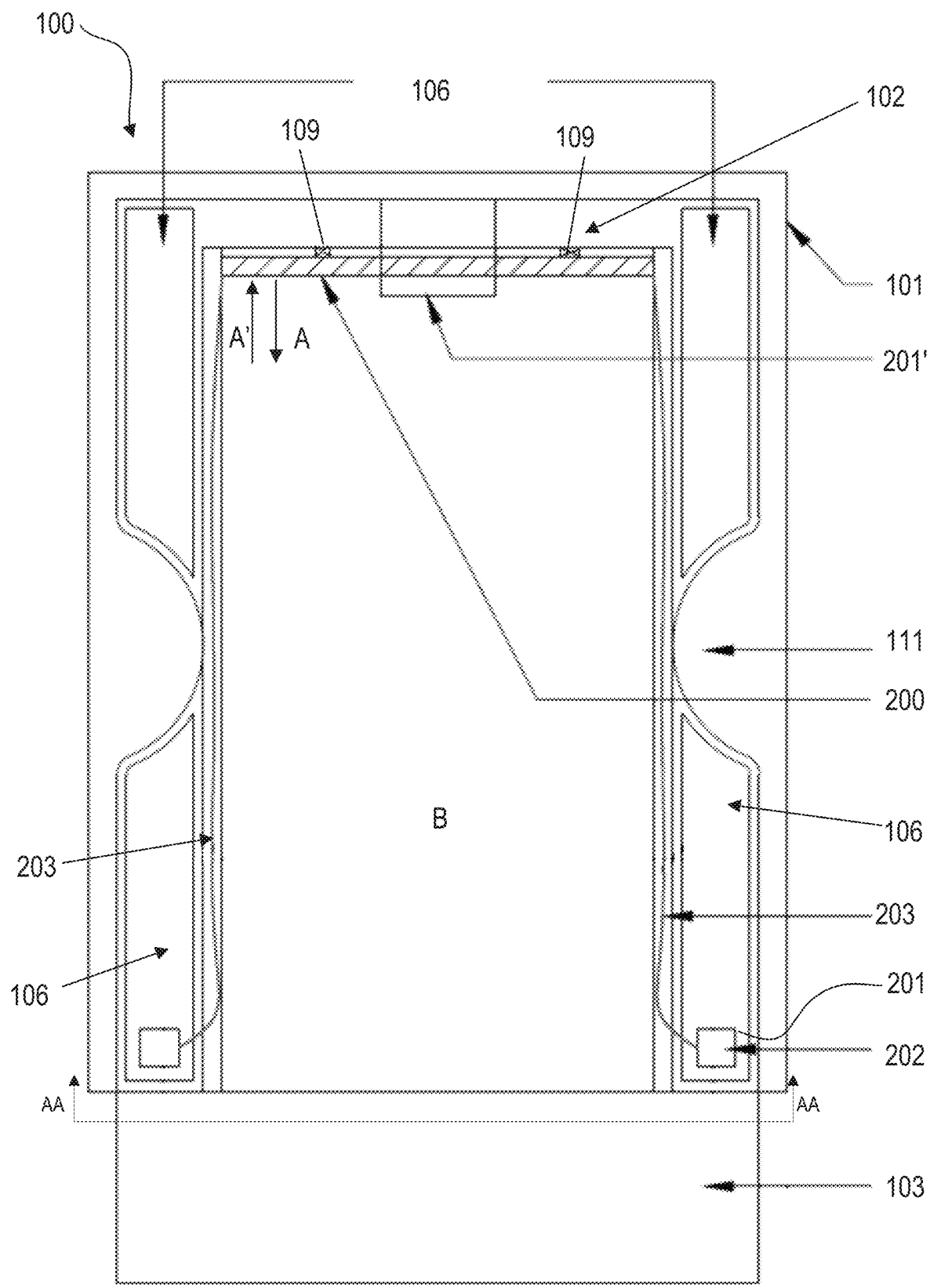
FIG. 2 is an overhead view of the pickup truck cargo bed of FIG. 1A.

In an embodiment, the push plate 200 may be configured to move in the direction from the cab wall 102 to the tail gate 103, i.e. direction A (shown in FIG. 2). In this example, push plate 200, opposing side walls 101, and tail gate 103 define an adjustable enclosed area "B" that decreases in size as the push plate 200 moves from the cab wall 102 to the tail gate 103. In the example shown in FIG. 2, the actuator 201 is an electric motor 203 coupled to push plate 200 with a cable 203. Push plate 200 may be connected to the cable with a connector such as a bracket (not shown), weld, or any other connecting means. A plurality of actuators 201 may be used to move the push plate. Continuing the above example, a distinct cable 203 may be defined within each of the plurality of tracks 105. Each cable 203 may be driven by a corresponding electric motor 203 to move the push plate 200 along the longitudinal length of the pickup truck cargo bed 100. As shown in FIG. 2, electric motor 202 is positioned near the tail gate 103 and is configured to move cable 203 and push plate 200 in the direction of tail gate 103. After being pulled toward the tail gate 103 a user may manually move the push plate 200 to its original position abutting or near the cab wall 102. In other embodiments, biasing members 109 (e.g. a spring or plurality of springs) may be used to bias push plate 200 toward the cab wall 102 to reset the position of push plate 200. In other embodiments, each cable 203 may be connected in a circuit about a plurality of pulleys (not shown), and motor 202 may be located at any position along the length of the pickup truck cargo bed 100. When in use, the push plate 200 may move from the cab wall 102 toward the tail gate 103 to move articles placed in the pickup truck cargo bed 100 toward the tail gate 103 for offloading the pickup truck cargo bed, or to move the push plate 200 toward to the cab wall 102. Prior to transporting articles placed in the pickup truck car, a user may secure the articles by moving push plate 200 toward the tailgate until the articles are secured between tailgate 103 and push plate 200, which restricts movement along the longitudinal length of pickup truck cargo bed 100.

As described above, other types of actuators may be used to move push plate 200 along the length of pickup truck cargo bed 100, e.g. hydraulic pistons, scissors lifts, gear drivers, or spiral lifts. These actuators may be placed in pickup truck cargo bed 100 to move the push plate 200 toward or away from the tail gate 103. In an example, actuators 201' are located in or proximate to cab wall 102 and move push plate 200 toward tail gate 103 by extending the piston, scissor lift, gear drive, spiral lift, etc. toward the tail gate 103. Conversely, push plate 200 may be retracted toward cab wall 102 by contracting the piston, scissor lift, gear drive, spiral lift, etc. In an embodiment, the actuators may be defined within the plurality of tracks 105, compartments 110, or opposing sidewalls 101 such that the actuators do not touch articles placed inside the pickup truck cargo bed 100. The location of the actuators 201' is not limited to a specific location so long as they may move push plate 200. In a further example, actuators 201' may be located within push plate 200 and may comprise a motor configured to drive movement members 401 in a direction along the longitudinal length of the pickup truck cargo bed 100.

Figure 3:
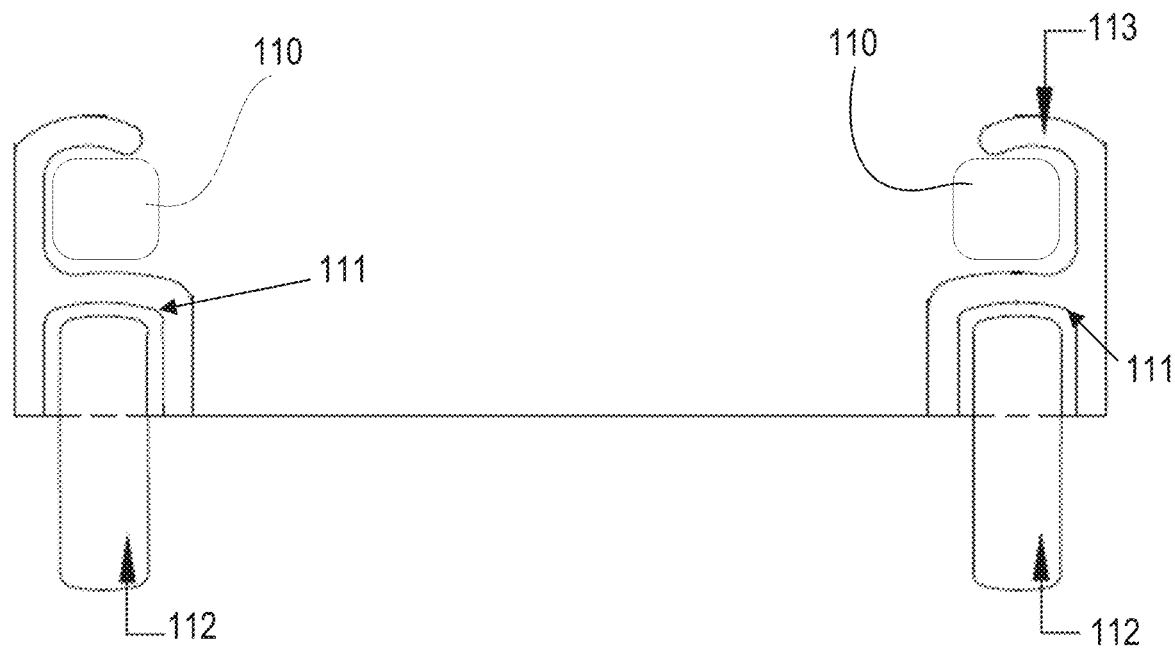
FIG. 3 is a cross sectional view of the pickup truck cargo bed 100 of FIG. 2 along the line AA-AA.

FIG. 3 illustrates a cross sectional view of an embodiment of the pickup truck cargo bed 100 having opposing wheel wells 111 for receiving tires 112. Opposing compartments 110 may each comprise a track for receiving a movement member of push plate 200. The track may have an intended mounting surface defining a channel for receiving a movement member. Channel 106 may assist the lateral sides of push plate 200 to move at the same rate such that the push plate remains at a right angle with respect to opposing sidewalls 101.

FIGS. 4A, 4B, and 4C each illustrate embodiments of push plate 200. FIG. 4A illustrates an embodiment of push plate 200 where movement members 401 are connected to the bottom edge 402 of the push plate 200. As noted in the examples above, push plate 200 may be moved the directions A, A' using actuator 201'. Movement members 401 may be configured to roll within ribs (not shown) of floor 104. FIGS. 4B and 4C illustrate an embodiment of push plate 200 where the movement members 401 are connected to the lateral edges 403 of push plate 200. As shown in FIG. 4B movement members 401 may be configured to be received in the plurality of tracks 105 connected to, or formed within, compartments 110. As shown, movement members 401 on opposing lateral sides of push plate 200 are rollers that may be connected by shaft 404 (illustrated as a stippled line in FIG. 4b) which is defined within push plate 200. Shaft 404 may force opposing rollers to rotate at the same rate so that each lateral edge 403 of push plate 200 moves at the same rate in direction A or A'. In an embodiment, actuator 201' may be coupled to shaft 404 to drive push plate 200 in direction A or A'.

FIG. 5A illustrates an fragmentary view of a movement member 401. In the illustrated embodiment, movement member 401 comprises rollers connected to shaft 404. Movement member 401 is disposed within track 105 that is defined within compartment 110 on each side of the pickup truck cargo bed 100.

FIG. 4C illustrates a fragmentary view of a movement member 401. In the illustrated embodiment, movement member 401 comprises rollers which may be connected to a shaft 404. As shown, plurality of tracks 105 are each connected to an exterior surface of one of compartments 110. FIG. 5B, illustrates a cross-sectional fragmentary view along the line B-B of FIG. 4C, showing an embodiment of the present invention where each movement member 401 comprises a plurality of rollers in horizontal alignment to keep the push plate 200 in at a desired angle (e.g. a right angle) with respect to the floor 104 and opposing sidewalls 101 as the push plate moves in the direction A or A'.

Figure 6A:
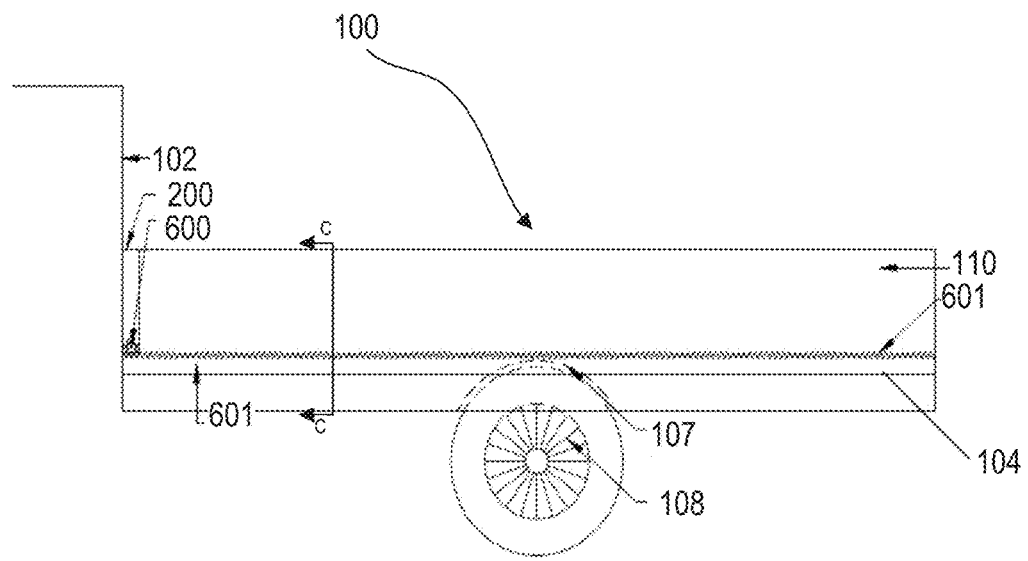
FIG. 6A is a cut away side elevation view of a pickup truck cargo bed.

FIG. 6A illustrates a cut away side view of a pickup truck cargo bed 100. Compartment 110 is shown as having an arcuate portion 107 configured to fit over wheel well 111 which is shown as defining a portion of wheel 108. In this embodiment, push plate 200 is driven by a rack an pinion linear actuator. The configuration of the embodiment shown in FIG. 6A is analogous to the examples above. Movement members are circular gears 600 which engage a track, i.e. linear gear 601. A plurality of circular gears 600 may be connected to push plate 200 for driving push plate 200 along corresponding linear gears 601 so that push plate 200 may move in the A, or A' direction. Linear gear(s) 601 may be connected to floor 104, compartments 110, or a combination of both the floor 104 and compartments 110. A plurality of linear gears 601 may also be placed at various locations within the pickup truck carbo bed 100 and each configured to extend along the longitudinal length pf the pickup truck carbo bed 100. When in use, a motor (not shown), e.g. an electric motor, drives the circular gear 600 which is connected to push plate 200 so that push plate 200 moves along linear gear 601 which in turn pushes articles (not shown) within the pickup truck cargo bed 100 toward the tail gate for unloading or to secure the articles against the tailgate for transport.

Figure 6B:
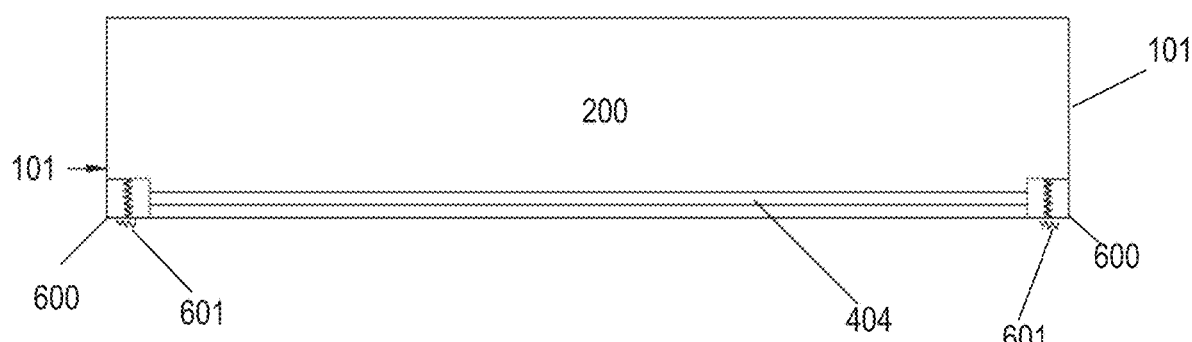
FIG. 6B is a cross sectional view of the pickup truck cargo bed of FIG. 6A along the line C-C.

FIG. 6B illustrates a cross sectional view along in the C-C of FIG. 6A depicting an embodiment of opposing circular gears 600 which are connected by shaft 404. Each circular gear 600 may mechanically cooperate with a corresponding linear gear 601 as gear 600 is driven by a motor to move push plate 200. As shown, opposing circular gears 600 may be located near lateral edges of push plate 200. As in the examples above, shaft 404 may permit circular gears 600 to rotate at the same speed so that the lateral edges of push plate 200 remain at a desired angle (e.g. a right angle) with respect to the opposing sidewall 101 of pickup truck cargo bed 100.

Figure 7A:
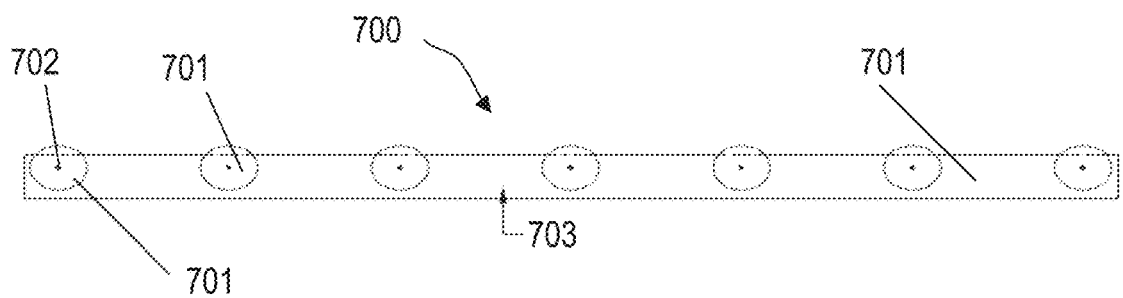
FIG. 7A is a side elevation view of an apparatus for moving articles in a pickup truck cargo box.
Figure 7B:
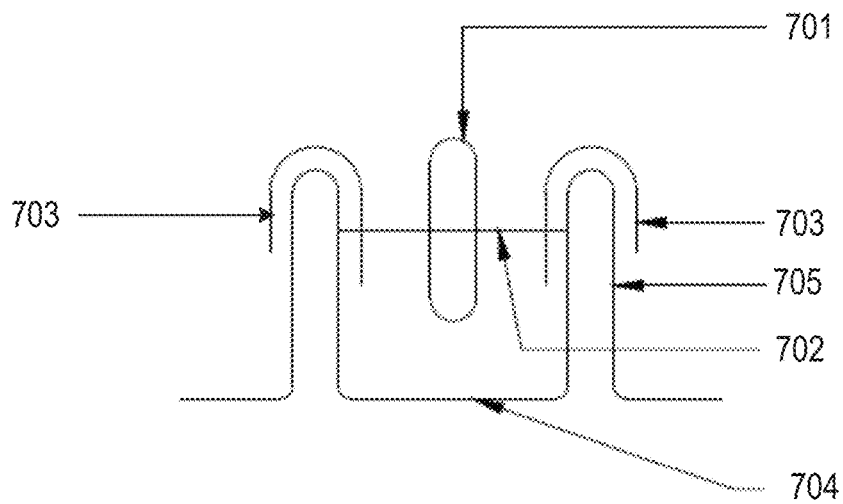
FIG. 7B is a cross sectional view of the apparatus of FIG. 7A shown connected to a ribbed floor of pickup truck cargo bed.
Figure 7C:
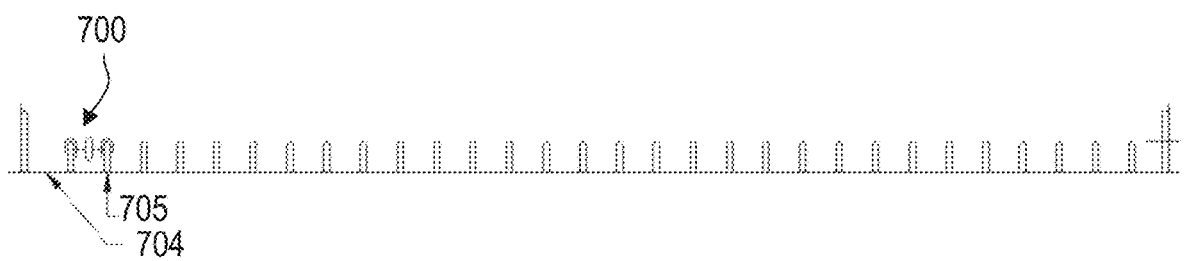
FIG. 7C is a cross sectional view of the apparatus of FIG. 7A shown connected to a ribbed floor of pickup truck cargo bed.

FIGS. 7A, 7B, and 7C illustrate an apparatus 700 for moving articles in a pickup truck cargo box. In an embodiment, a plurality of rollers 701 each having an axel 702 which is connected to opposing attachment members 703, the plurality of rollers 701 spaced along a length of each of the opposing attachment members 701. In an example, the opposing attachment members 703 are configured to extend along a longitudinal length of the pickup truck cargo box.

In an embodiment, the opposing attachment members 703 have a substantially U-shaped cross-section and support rollers 701 between each of the opposing attachment members 703. The opposing attachment members 703 may be configured to couple with a floor 704 of the pickup truck cargo box and support the rollers 701 between each of the opposing attachment members 703. In a further embodiment, the substantially U-shaped cross-section is configured to couple with longitudinal ribs 705 of the floor of the pickup truck cargo box.

When in use, one or more apparatus 700 may be laid on a longitudinal length of a pickup truck cargo box. Articles placed on top of apparatus 700 may be rolled along the longitudinal length by rollers 701 reducing the energy and force required to move articles within the pickup truck cargo box in comparison to sliding the articles along a typical floor of a pickup truck cargo box.

Apparatus 700 for moving articles in a pickup truck cargo box described in relation to FIGS. 7A-7C may be used in combination with the apparatus 1 described above in relation to FIGS. 1-6B. For example, as push plate 200 is moved in direction A or A' it may be configured to leave a gap between a bottom edge of the push plate 200 and the top of apparatus 700. Accordingly, as push plate 200 moves and article along the longitudinal length of the top of apparatus 700, the friction and force necessary to move the articles along the longitudinal length may be further reduced if that article may roll on apparatus 700.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the detailed embodiments described above and illustrated are intended to be examples only. The invention is defined by the appended claims.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An apparatus for moving and securing articles in a pickup truck cargo bed having opposing sidewalls, cab wall, tailgate, and floor, the apparatus comprising:

opposing compartments each configured to couple to each one of the opposing sidewalls of the pickup truck cargo bed, each of the opposing compartments comprising at least one track of a plurality of tracks, wherein the opposing compartments have opposing sidewalls, wherein each of the plurality of tracks has an opposing track positioned on or in the opposing sidewall of the opposing compartment;

each of the plurality of tracks extend substantially along a longitudinal direction of the pickup truck cargo bed and define a channel;

a push plate slidably mounted to the plurality of tracks with a plurality of movement members, the push plate configured to stand perpendicular to the floor and to move the articles in the pickup truck cargo bed toward the tailgate; and an actuator in mechanical communication with the push plate, the actuator configured to move the push plate to a desired position in the pickup truck cargo bed;

wherein the push plate, opposing side walls of each compartment, and tail gate define an adjustable enclosed area for storing and securing the articles in the pickup truck cargo bed;

wherein each compartment is configured to fit entirely within the pickup truck cargo bed, wherein the actuator is a motor in mechanical communication with the push plate, and wherein the motor is configured to move the push plate to the desired position when activated, and wherein the movement member is configured to be defined by and move within the channel parallel to the longitudinal direction.

2. The apparatus of claim 1, wherein the movement member is a roller.

3. The apparatus of claim 1, wherein when activated, the actuator moves the push plate until the articles of the pickup truck cargo bed abut the push plate and either the cab wall or tailgate.

4. The apparatus of claim 1, wherein each compartment is configured to be mounted onto opposing wheel wells of the pickup truck cargo bed.

5. The apparatus of claim 1, comprising a plurality of linear gears connected to the floor of the pickup truck cargo bed, the push plate mounted on the plurality of linear gears.

6. The apparatus of claim 1, wherein the motor is connected to the push plate with a cable.

7. The apparatus of claim 6, wherein the cable is defined within the channel of the plurality of tracks.

8. The apparatus of claim 1, wherein each of the opposing compartments has a non-unitary structure, and wherein each of the opposing compartments has a plurality of sub-compartments.

9. The apparatus of claim 1, wherein the channel of each of the plurality of tracks is defined by one of the opposing compartments.

10. The apparatus of claim 1, wherein the opposing compartments, each of the plurality of tracks, and the push plate are defined entirely within a volume of the pickup truck cargo bed, and wherein the volume of the pickup truck cargo bed is defined by the opposing sidewalls, the cab wall, the tailgate, the floor, and a cargo truck cover when the cargo truck cover is positioned on the pickup truck cargo bed.

* * * * *